Figure 1:
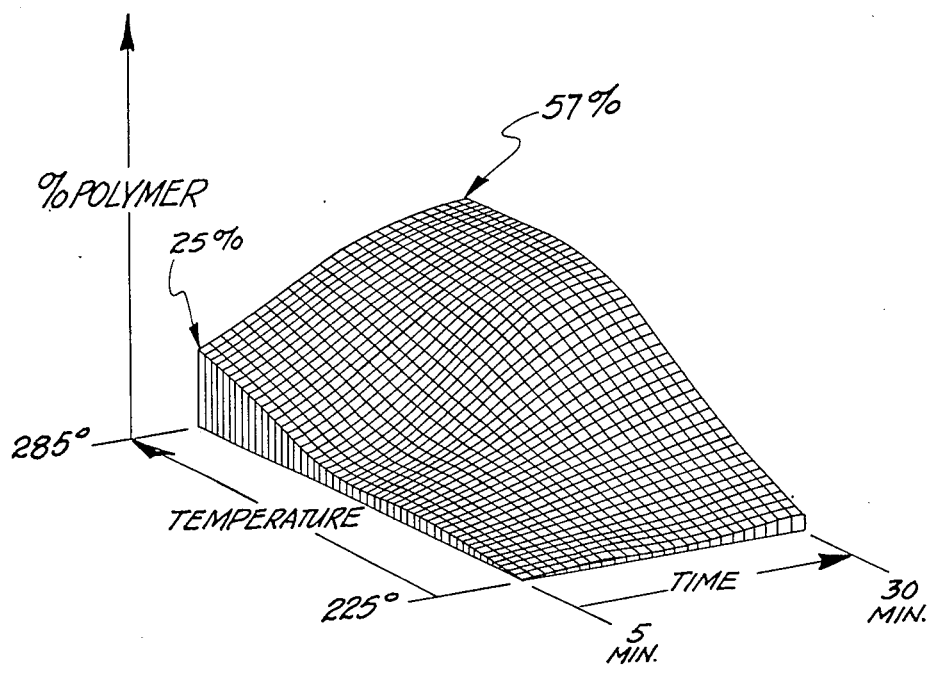
Figure 1:
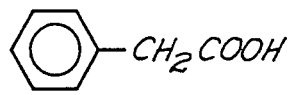

United States Patent [19]

Stewart

[11] Patent Number: 4,778,875

[45] Date of Patent: Oct. 18, 1988

[54] PREPARATION OF LINEAR POLYCARBONATES FROM CYCLIC OLIGOMER COMPOSITIONS USING BENZYL CARBANION-GENERATING CATALYST

[75] Inventor: Kevin R. Stewart, Voorheesville, N.Y.

[73] Assignee: General Electric Company, Schenectady, N.Y.

[21] Appl. No.: 44,376

[22] Filed: Apr. 27, 1987

[51] Int. Cl.$^4$ .............................................. C08G 63/62
[52] U.S. Cl. ................................... 528/371; 528/370
[58] Field of Search .................................. 528/371, 370

[56] References Cited

U.S. PATENT DOCUMENTS 4,605,731  8/1980  Evans et al. ......................... 528/371
4,644,053  2/1987  Brunelle et al. .................... 528/371

OTHER PUBLICATIONS

*Hackh's Chemical Dictionary,* 4th Edition (1969), pp. 92 and 510.

*Primary Examiner*—Harold D. Anderson
*Attorney, Agent, or Firm*—William H. Pittman; James C. Davis, Jr.; James Magee, Jr.

[57] ABSTRACT

Cyclic polycarbonate oligomers are converted to linear polycarbonate resins by heating with a polycarbonate formation catalyst which generates benzyl carbanions at temperatures up to about 300° C. The preferred catalysts are unsubstituted or nuclearly substituted phenylacetic acids and their salts.

15 Claims, 6 Drawing Sheets

PREPARATION OF LINEAR POLYCARBONATES FROM CYCLIC OLIGOMER COMPOSITIONS USING BENZYL CARBANION-GENERATING CATALYST

This invention relates to the preparation of linear polycarbonates and similar condensation polymers, and more particularly to an improved method for their preparation from cyclic oligomer compositions.

The conversion of low molecular weight cyclic aromatic carbonate polymers to linear polycarbonates is known. Reference is made, for example, to the following U.S. Pat. Nos.:

3,155,683,
3,274,214,
3,386,954
3,422,119.

More recently, cyclic polycarbonate oligomer mixtures and similar mixtures involving thiol analogs of the carbonates have been prepared and converted to linear polycarbonates, often of very high molecular weight, by contact with a wide variety of polycarbonate formation catalysts. Reference is made, for example, to U.S. Pat. Nos. 4,605,731 and 4,644,053, the disclosures of which are incorporated by reference herein.

These catalysts include various bases and Lewis acids, exemplified by polyvalent titanium and aluminum chelates and tetraarylborate salts. However, said catalysts are not ideal for use under all possible conditions. For example, the titanium-containing catalysts frequently lead to the formation of colored products, a serious disadvantage in the preparation of transparent polycarbonate sheet material. Various other catalysts become active only at temperatures too high for commercial practicability.

The tetraarylborates and particularly the tetraphenylborates constitute a class of particularly interesting polycarbonate formation catalysts. However, under many conditions they are too active at relatively low temperatures for convenient use. For example, various tetraphenylborate salts begin causing polymerization of cyclic oligomers at temperatures so low that melting of said oligomers is not yet complete, exemplified by temperatures in the range of 185°–190° C. Thus, these catalysts are not suitable for use under conditions where it is desired to manipulate the catalyst-cyclic oligomer mixture under conditions of complete liquidity and relatively low melt viscosity. Such manipulation is frequently necessary at temperatures of 200° C. or slightly above.

The present invention provides a genus of polycarbonate formation catalysts which are inactive or only moderately active at temperatures in the range of about 200°–230° C., but which become highly active at higher temperatures such as those in the range of about 230°–300° C. Furthermore, said catalysts may be used in very low concentrations, often lower than is the case with previously disclosed polycarbonate formation catalysts. The linear polycarbonate products obtained by the use of such catalysts are colorless and have other desirable properties.

In one of its aspects, the invention is an improvement in a method for preparing a resinous composition by contacting with a polycarbonate formation catalyst a composition comprising cyclic oligomers having the formula

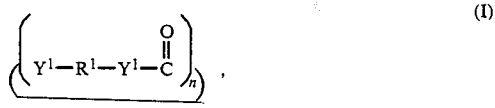

wherein at least about 60% of the total number of $R^1$ radicals are divalent aromatic organic radicals and the balance are divalent aliphatic, alicyclic or aromatic radicals, each $Y^1$ is independently oxygen or sulfur and n is from 2 to about 30; said improvement comprising employing as the polycarbonate formation catalyst at least one compound which generates unsubstituted or substituted benzyl carbanions at temperatures in the range of about 200°–300° C.

In another aspect of the invention, the polycarbonate formation catalyst is an unsubstituted or nuclearly substituted phenylacetic acid or salt thereof. As will become apparent hereinafter, the free acids are substantially inactive at temperatures up to about 250° C., while the salts become active at lower temperatures, sometimes as low as about 210° C. By the use of nuclearly substituted phenylacetic acids, modifications of activity may be made in a predictable fashion.

As will be apparent from the above, the cyclic oligomers useful according to this invention may contain organic carbonate, thiolcarbonate and/or dithiolcarbonate units. The various $R^1$ values therein may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, poly-1,4-(2-butenylene), poly-1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing nonhydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

At least about 60% and preferably at least about 80% of the total number of $R^1$ values in the cyclic oligomers, and most desirably all of said $R^1$ values, are aromatic. The aromatic $R^1$ radicals preferably have the formula

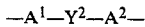

wherein each of $A^1$ and $A^2$ is a monocyclic divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$. Such R values may be considered as being derived from bisphenols of the formula HO—$A^1$—$Y^2$—$A^2$—OH. Frequent reference to bisphenols will be made hereinafter, but it should be understood that R values derived from suitable compounds other than bisphenols may be employed as appropriate.

In formula II, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^1$, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^1$ values may be considered as being derived from dihydroxy compounds of the formula $$HO-R^1-OH \quad (III)$$

or their dithiol analogs, especially dihydroxyaromatic compounds and preferably bisphenols of the formula $HO-A^1-Y^1-A^2-OH$. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
$\alpha,\alpha'$-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
$\alpha,\alpha$-Bis(4-hydroxyphenyl)toluene
$\alpha,\alpha,\alpha',\alpha'$-Tetramethyl-$\alpha,\alpha'$-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A (in which $A^1$ and $A^2$ are each p-phenylene and $Y^2$ is isopropylidene) is often preferred for reasons of availability and particular suitability for the purposes of the invention.

The cyclic oligomers have degrees of polymerization from 2 to about 30. Cyclic oligomer mixtures in which the molecular species have varying degrees of polymerization up to about 20, with a major proportion being up to about 12 and a still larger proportion up to about 15, are especially preferred. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures contain very low proportions (if any) of linear oligomers. In general, no more than about 10% by weight, and most often no more than about 5%, of such linear oligomers are present. The mixtures also usually contain low percentages, if any (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

Suitable cyclic oligomer mixtures may be prepared by a condensation reaction involving at least one compound selected from the group consisting of bishaloformates and thiol analogs thereof, said compounds having the formula

or a mixture thereof with at least one bis(active hydrogen) compound having the formula

wherein $R^1$ and $Y^1$ are as defined hereinabove and X is chlorine or bromine. (The compound of formula IV or mixture thereof with that of formula V is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula IV and, optionally, formula V, the bishaloformate composition may also contain other compounds, including oligomers of the formula

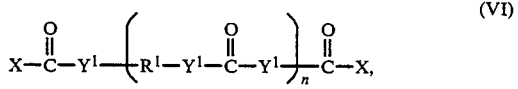

wherein $R^1$, X and $Y^1$ are as previously defined and n is a small number, typically about 1–4.

While the X values in formula IV may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable dihydroxy compounds of formula V include those having divalent radicals of formula I which are different from the corresponding divalent radicals in the compound of formula IV. When such dihydroxy compounds are present, they generally comprise up to about 50%, most often up to about 20% and preferably up to about 10%, of the bischloroformate mixture. Most preferably, however said mixture consists essentially of bischloroformates.

The tertiary amines useful in the oligomer formation reaction ("tertiary" in this context denoting the absence of N—H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6–14 carbon atoms.

The most useful amines are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–16M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003-0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1-1.0:1 and most often about 0.2-0.6:1. The preferred molar ratio of alkali metal hydroxide to said composition is about 1.5-3:1 and most often about 2-3:1.

In a second step, the oligomer mixture may be separated from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°-50° C.; the amount of bischloroformate composition used being up to about 0.7 mole for each liter of said organic liquid present in the reaction system, and the molar proportions of amine and alkali metal hydroxide to bischloroformate composition being approximately 0.2-1.0:1 and 2-3:1, respectively; and recovering the cyclic oligomers thus formed.

As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25-30 minutes to complete cyclic oligomer preparation by this method, and the cyclic oligomer yield may be 85-90% or more. The crude product usually also contains only minor amounts of high molecular weight linear polycarbonates as by-products. By contrast, use of a less preferred embodiment may, depending on reaction scale, require an addition period as long as 8-10 hours and the crude product may contain substantial proportions of linear by-products with molecular weights of about 4,000-10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9-10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLE 1

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of a 1.06M solution of the bischloroformate in methylene chloride was added over 37 minutes. There were concurrently added an additional 35 ml. of the bisphenol A disodium salt solution over 32 minutes 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLE 2

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 3–12

Following the procedure of Example 2, products containing at least about 80% mixed cyclic polycarbonate oligomers were prepared from mixtures of bisphenol A bischloroformate and the dihydroxy compounds listed in Table 1. In each case, a total of 2 mmol. of bischloroformate composition was used. The proportion of the listed dihydroxy compound therein was 10 mole percent unless otherwise indicated.

TABLE 1

| Example | Dihydroxy compound |
| --- | --- |
| 3 | 1,1-Bis(4-hydroxyphenyl)cyclohexane |
| 4 | 1,1-Bis(4-hydroxyphenyl)cyclododecane |
| 5 | 2,2-Bis(3,5-dimethyl-4-hydroxyphenyl)propane |
| 6 | 2,2-Bis(3,5-dibromo-4-hydroxyphenyl)propane |
| 7 | 2,2-Bis(4-hydroxyphenyl)-1,1-dichloroethylene |
| 8 | Hydroquinone |
| 9 | Hydroquinone (15 mole percent) |
| 10 | Bis(4-hydroxyphenyl) sulfide |
| 11 | Bis(4-hydroxyphenyl) sulfone |
| 12 | Bis(3,5-dimethyl-4-hydroxyphenyl) sulfone |

As previously explained, one aspect of the present invention is conversion of the above-described cyclic oligomers to linear polycarbonates by contact with a polycarbonate formation catalyst which generates unsubstituted or nuclearly substituted benzyl carbanions. While the present invention is not dependent on any theory or reaction mechanism, it is believed that said carbanions undergo an addition reaction with the electrophilic carbonate carbon atoms in accordance with the equation

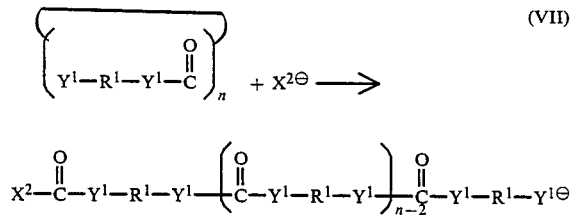

wherein n is the number of structural units in the oligomer molecule, $X^2$ is the carbanion and $R^1$ and $Y^1$ are as previously defined. The product of this step is a highly reactive linear oxy anion which in turn undergoes an addition reaction with further carbonate moieties, forming "living" linear polycarbonate species.

Among the molecules which can generate benzyl carbanions are the salts of unsubstituted and nuclearly substituted phenylacetic acids. Such salts are readily decarboxylated to benzyl carbanions at about 210° C. or higher, and are therefore catalytically active above that temperature. The alkali metal salts are preferred, with lithium salts being very active catalysts and sodium salts somewhat less active. Moreover, the presence of one or more electron-withdrawing nuclear substituents such as nitro, acyl or halo facilitates decarboxylation by stabilizing the benzyl carbanion, thus increasing catalytic activity. Conversely, electron-releasing substituents such as alkyl and alkoxy inhibit decarboxylation by destabilizing the benzyl carbanion, thus decreasing catalytic activity.

The free phenylacetic acids are also frequently active as polycarbonate formation catalysts, despite the fact that they do not normally generate benzyl carbanions upon decarboxylation. While the invention is not dependent on theory, it is believed that the free carboxylic acid groups in said acids are deprotonated by "living" polycarbonate anions, which are generally present in any cyclic polycarbonate oligomer mixture prepared as previously described.

This belief is confirmed by various experiments conducted in solution in refluxing o-dichlorobenzene; i.e., at a temperature of about 180° C., at which cyclics polymerization normally takes place in solution. The oligomer employed was the pure bisphenol A cyclic polycarbonate tetramer, isolated by fractional precipitation and extraction as described in the aforementioned U.S. Pat. No. 4,644,053, and essentially free from "living" anionic species. Using a lithium phenylacetate catalyst, conversion to linear polycarbonate was essentially complete within 6 hours. With phenylacetic acid, no detectable polymerization had taken place at the end of that period.

Because of the relatively low concentration of such "living" anions and the necessity for their reaction with the free phenylacetic acids in order to produce an active catalyst, such acids generally become active at higher temperatures than the salts, typically above about 250° C., and require longer reaction times. Thus, in a preferred embodiment of the invention the polycarbonate formation catalyst is a lithium or sodium salt of a phenylacetic acid and polymerization is effected at a temperature in the range of about 235°–300° C. In another preferred embodiment, the catalyst is a free phenylacetic acid and polymerization is effected at a temperature in the range of about 255°–300° C.

The polymerization reaction is typically effected by merely contacting the cyclic oligomer mixture with the catalyst at temperatures in the above ranges until polymerization has proceeded to the extent desired. Although a solvent may be used, it is not necessary and is frequently not preferred. It is within the scope of the invention to conduct the polymerization in a mold to produce a molded article, or in an extruder to produce a linear polycarbonate as the extrudate.

Compositions comprising cyclic oligomers of formula I and at least one of the catalysts described herein may be prepared by dissolving the cyclic composition in a suitable solvent, preferably methylene chloride, to which the catalyst species is added in the desired proportions. The solvent is then evaporated to produce an intimate blend of the catalyst with the cyclic composition. Such blend is stable at ambient temperatures but may be readily polymerized by heating to an appropriate temperature. Polymerizable compositions of this type are another aspect of the invention.

The proportion of catalyst used in the method of this invention will depend to some extent on the molecular weight of the polymer desired and the time available for completion of the polymerization reaction. Since a "living" polymerization is involved, the molecular weight of the polymer will vary inversely with the proportion of catalyst used. On the other hand, the reaction rate varies directly with the proportion of catalyst. Therefore, as said proportion is increased, the time required for polymerization and the molecular weight of the product both decrease.

Balancing these factors, it is generally found that catalyst proportions of about 0.001-0.5 mole percent, based on structural units in the oligomer, are satisfactory. In order to minimize carbon dioxide evolution as a result of decarboxylation and bubble formation in the linear polycarbonate product, it is most often preferred to use very low catalyst amounts such as about 0.001-0.1 mole percent. Such evolution at these levels does not present difficulties.

The invention is illustrated by the following example. The cyclics composition used in the example was a cyclic bisphenol A polycarbonate oligomer mixture similar to that of Example 1. The carboxylic acids employed were commercially available materials, and the salts were prepared from the free acids by treatment with an equivalent amount of metal carbonate in boiling water, followed by cooling, filtration and removal of water by lyophilization.

EXAMPLE 13

Cyclic compositions were dissolved in methylene chloride and various phenylacetic acids or their salts were added in the amounts of 0.1 mole percent based on structural units in the oligomer compositions. The methylene chloride was evaporated and resulting solids were dried in a vacuum oven for 15 hours at 100° C.

Polymerization was effected by heating the samples in a molten salt bath at the desired temperature for the specified time. The products were cooled, dissolved in chloroform and analyzed by gel permeation chromatography.

Figure 2:
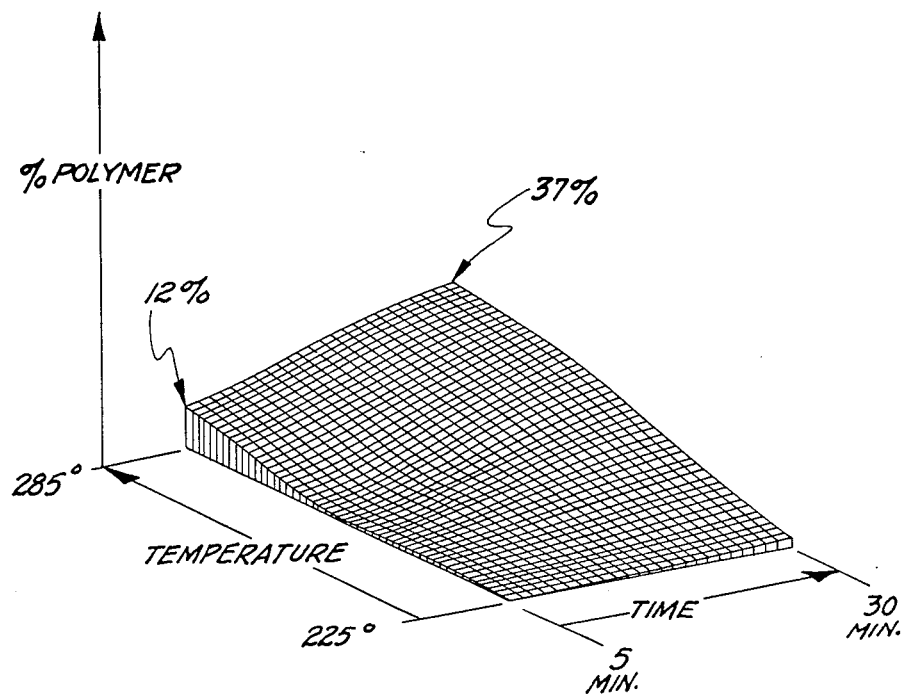
Figure 2:
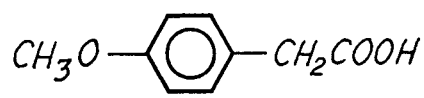
Figure 3:
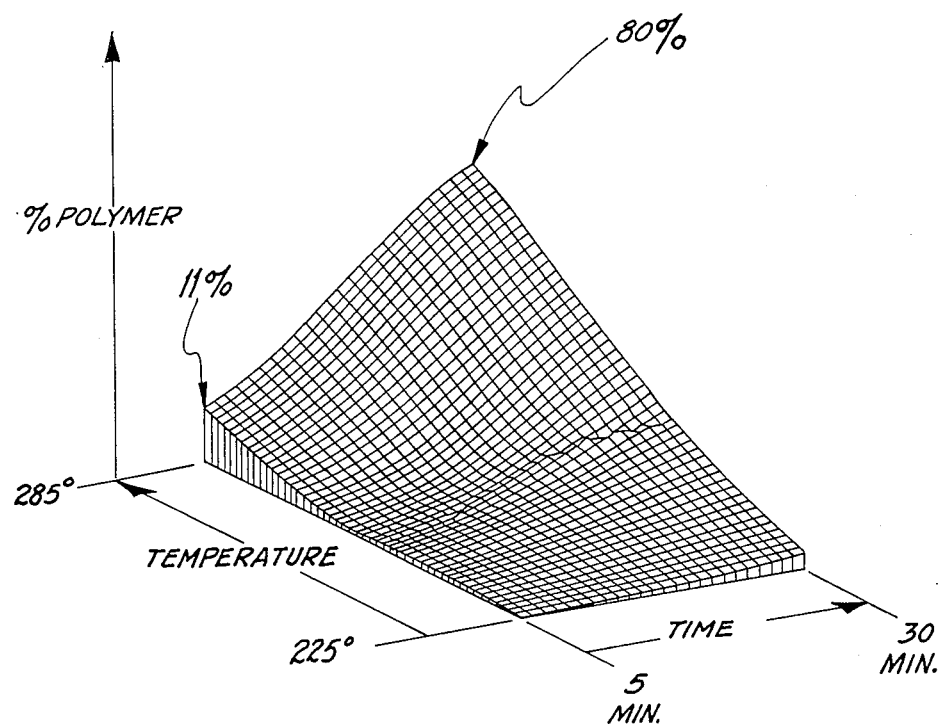
Figure 3:
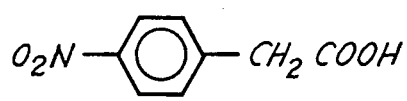

Reference is now made to the drawings which are graphical representations of the results of the polymerization reactions. As shown by FIGS. 1-3, polymerization using the free acids as catalysts was relatively slow, being incomplete after 30 minutes even at 285° C.; however, complete polymerization may be expected to occur upon employing longer reaction times and/or higher temperatures. The acids increase in catalytic activity with an increase in electron-withdrawing nature of the nuclear substituents.

Figure 4:
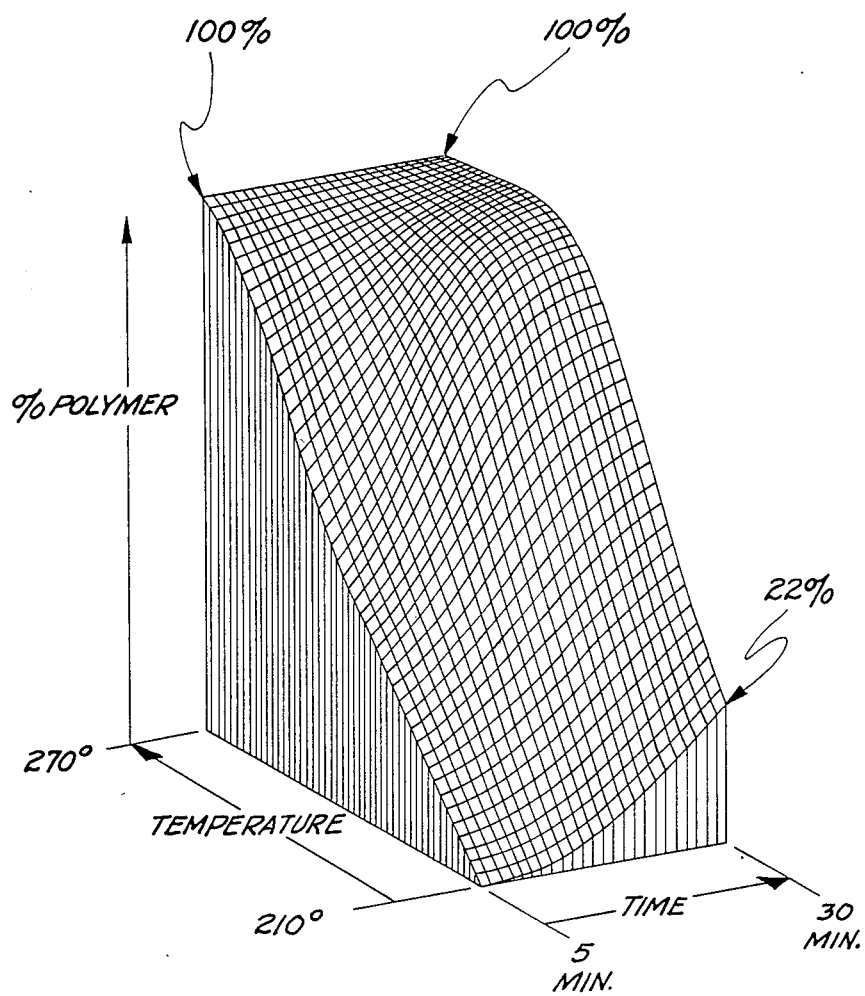
Figure 4:
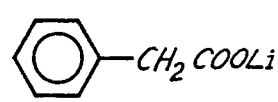
Figure 5:
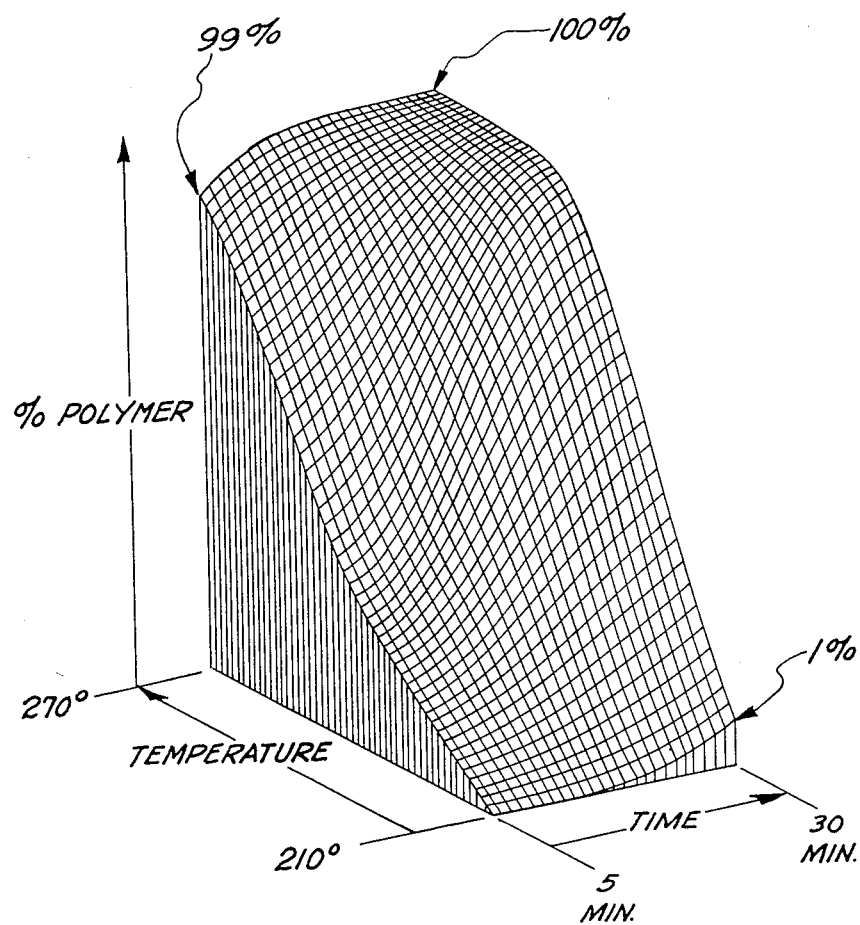
Figure 5:
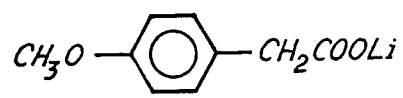
Figure 6:
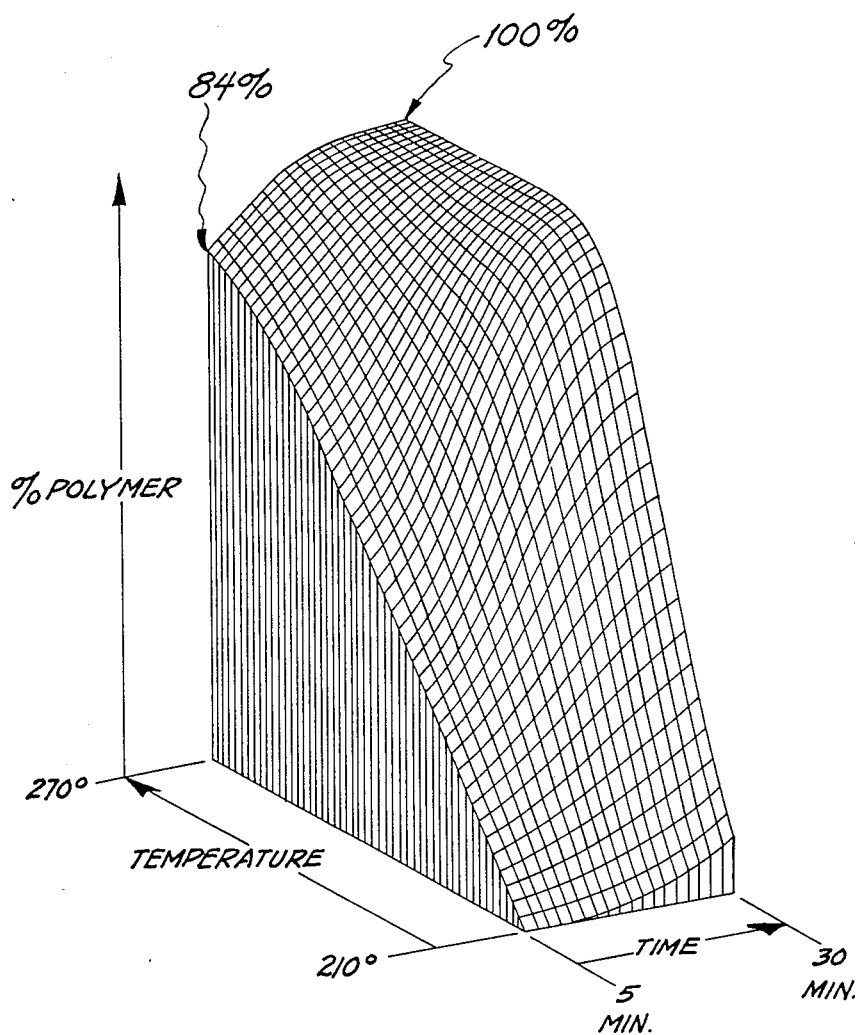
Figure 6:
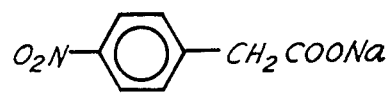

FIGS. 4-6 compare salts of the same acids. It will be seen that salt-catalyzed polymerization was complete for all samples after 10 minutes at 270° C. At lower temperatures the substitution and counterion effects are seen, with the salt containing the electron-releasing methoxy substituent being essentially inactive at 210° C. and the same being true of the sodium salt of the acid containing a highly electron-withdrawing substituent. At 240° C., however, all three salts are substantially active and polymerization is essentially complete within 30 minutes.

These results show that phenylacetic acid salts are highly effective polymerization catalysts at temperatures as low as 240° C. The free acids, on the other hand, require higher temperatures and longer time periods for effective polymerization. Thus, it will be apparent that the invention provides a spectrum of catalysts which may be chosen according to the desired polymerization conditions.

Tables I and II list the approximate weight average molecular weights of the linear polycarbonates obtained according to Example 13.

TABLE I

| Catalyst | Time, min. | Temperature, °C. 260 | Temperature, °C. 285 |
|---|---|---|---|
| Phenylacetic acid | 5 | — | 117,400 |
|  | 10 | 79,800 | 115,800 |
|  | 15 | 95,900 | 102,400 |
|  | 20 | 110,800 | 90,400 |
|  | 30 | 108,700 | 80,900 |
| 4-Methoxyphenylacetic acid | 5 | — | 100,600 |
|  | 10 | 94,600 | 107,500 |
|  | 15 | 93,700 | 105,900 |
|  | 20 | 106,100 | 92,300 |
|  | 30 | 114,500 | 79,400 |
| 4-Nitrophenylacetic acid | 5 | — | 84,900 |
|  | 10 | 62,600 | 109,400 |
|  | 15 | 65,800 | 101,800 |
|  | 20 | 69,000 | 91,100 |
|  | 30 | 80,400 | 86,800 |

TABLE II

| Catalyst | Time, min. | Temperature, °C. 210 | Temperature, °C. 240 | Temperature, °C. 285 |
|---|---|---|---|---|
| Lithium phenylacetate | 5 | — | 46,800 | 96,200 |
|  | 10 | — | 70,000 | 87,900 |
|  | 15 | 55,400 | 72,200 | 73,100 |
|  | 20 | 68,400 | 86,400 | 67,400 |
|  | 30 | 78,800 | 88,700 | 52,800 |
| Lithium 4-methoxyphenyl-acetate | 5 | — | 47,300 | 91,100 |
|  | 10 | — | 59,500 | 72,700 |
|  | 15 | — | 70,000 | 57,100 |
|  | 20 | — | 82,200 | 49,700 |
|  | 30 | — | 93,200 | 46,100 |
| Sodium 4-nitrophenyl-acetate | 5 | — | 56,700 | 57,700 |
|  | 10 | — | 52,600 | 42,900 |
|  | 15 | — | 66,600 | 45,300 |
|  | 20 | — | 79,400 | 48,800 |
|  | 30 | — | 82,700 | 46,100 |

What is claimed is:

1. In a method for preparing a resinous composition by contacting with a polycarbonate formation catalyst a composition comprising cyclic oligomers having the formula

(I)

wherein at least about 60% of the total number of $R^1$ radicals are divalent aromatic organic radicals and the balance are divalent aliphatic, alicyclic or aromatic radicals, each $Y^1$ is independently oxygen or sulfur and n is from 2 to about 30; the improvement which comprises employing as the polycarbonate formation catalyst at least one unsubstituted or nuclearly substituted phenylacetic acid or salt thereof.

2. A method according to claim 1 wherein each $R^1$ has the formula

(II), each $Y^1$ is oxygen, each $A^1$ and $A^2$ is a monocyclic divalent aromatic radical and $Y^2$ is a bridging radical in which one or two atoms separate $A^1$ from $A^2$; and wherein the catalyst is present in the amount of about 0.001-0.5 mole percent, based on structural units in the oligomer composition.

3. A method according to claim 2 wherein the cyclic oligomer composition is a cyclic oligomer mixture in which the molecular species have varying degrees of polymerization up to about 20.

4. A method according to claim 3 wherein $Y^2$ is isopropylidene and $A^1$ and $A^2$ are each p-phenylene.

5. A method according to claim 4 wherein a major proportion of the molecular species in the cyclic oligomer mixture have degrees of polymerization up to about 12.

6. A method according to claim 4 wherein the polycarbonate formation catalyst is phenylacetic acid.

7. A method according to claim 4 wherein the polycarbonate formation catalyst is 4-methoxyphenylacetic acid.

8. A method according to claim 4 wherein the polycarbonate formation catalyst is 4-nitrophenylacetic acid.

9. A method according to claim 4 wherein the polycarbonate formation catalyst is lithium or sodium phenylacetate.

10. A method according to claim 4 wherein the polycarbonate formation catalyst is lithium or sodium 4-methoxyphenylacetate.

11. A method according to claim 4 wherein the polycarbonate formation catalyst is lithium or sodium 4-nitrophenylacetate.

12. A polymerizable composition comprising cyclic oligomers having the formula

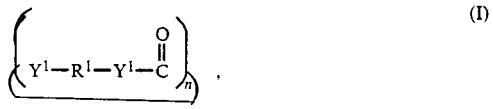

wherein at least about 60% of the total number of $R^1$ radicals are divalent aromatic organic radicals and the balance are divalent aliphatic, alicyclic or aromatic radicals, each $Y^1$ is independently oxygen or sulfur and n is from 2 to about 30; and at least one unsubstituted or nuclearly substituted phenylacetic acid or salt thereof.

13. A composition according to claim 12 wherein $R^1$ has the formula $$-A^1-Y^2-A^2- \quad \text{(II),}$$

each $Y^1$ is oxygen, each $A^1$ and $A^2$ is a monocyclic divalent aromatic radical and $Y^2$ is a bridging radical in which one or two atoms separate $A^1$ from $A^2$; and wherein the catalyst is present in the amount of about 0.001–0.5 mole percent based on structural units in the oligomers.

14. A composition according to claim 13 wherein the cyclic oligomer composition is a cyclic oligomer mixture in which the molecular species have varying degrees of polymerization up to about 20.

15. A composition according to claim 14 wherein $Y^2$ is isopropylidene and $A^1$ and $A^2$ are each p-phenylene.

* * * * *